Patented May 20, 1941

2,242,489

UNITED STATES PATENT OFFICE 2,242,489

OIL COMPOSITION

Victor H. Turkington, Caldwell, N. J., assignor, by mesne assignments, to Union Carbide and Carbon Corporation, New York, N. Y., a corporation of New York No Drawing. Application November 16, 1938, Serial No. 240,707

7 Claims. (Cl. 260—19)

This invention relates to compositions primarily intended for coatings and their preparation in which fatty or drying oils are incorporated.

Numerous coating compositions have been prepared from drying oils and various forms of phenolic resins. Such compositions have proved very satisfactory for many uses, but they have certain defects in common with all oil-type coating compositions in which oxidation plays an important part in the hardening process. They are limited to applications in relatively thin coats, as thick coatings harden only at the surface exposed to air and remain soft underneath, thus setting up strains and causing wrinkling or other surface defects. Also, it is well known that oxidation continues as the film ages or is exposed to weathering, finally resulting in embrittlement and failure. Thin coat applications complicate many industrial coating processes as it is necessary to apply three or four separate coats in order to build up a required film thickness, thus adding materially to solvent losses, time and costs. In addition, the processes employed in making such materials involve cooking the oils and resins together at temperatures requiring closely controlled conditions in order to obtain satisfactory uniformity.

It has also been proposed to react a drying oil with a phenol and then to add hexamethylenetetramine to form a resin. With hexamethyletnetetramine included as an ingredient, however, there is a tendency to gel or thicken during storage, and it is not practical to use it in amounts appreciably higher than needed for hardening. Moreover, the hardening of thick masses is not apt to be uniform on account of the evolution of ammonia and other volatiles.

The present invention rests on the discovery that a useful homogeneous, non-separable and hardenable composition is obtainable from a phenol-oil reaction product or complex by incorporating therewith a phenolic resin of the heat-hardenable type characterized by solubility in the complex. Such a composition upon heating solidifies to a very tough, adhesive and chemically resistant product suitable as a binder for plastic moldable masses, linoleum and calendering materials, or as a baking coating for metals, etc. Since driers are not included and oxidation is practically absent, the composition can be applied in thick films and baked without wrinkling or case-hardening on the surface. In comparison with compositions made by reacting hexamethylenetetramine with a phenol-oil complex, products are obtained of better color and possessing stability on storage as there is but little tendency to thicken or gel, a much wider range of proportions is possible since the resinous ingredient can be as great or as little in amount as desired, and hardening in thick masses is substantially uniform throughout.

A phenol-oil complex is produced by digesting a phenol and a fatty acid or oil in the presence of a converting agent, such as phosphoric acid, boric acid, etc. The complex is then incorporated with an oil-soluble heat-hardening phenolic resin in any one of several ways, such as simple blending or blending together with heating or mixing solutions of the two components.

In preparing the complex, phenol or its homologs, such as the cresols, the xylenols, or the higher alkyl or aryl substituted phenols, can be used wholly or in part. The selection of the phenol depends largely upon the requirements or intended use of the composition; but phenol itself is found preferable for making the complex. The substituted phenols react more slowly, and therefore necessitate either longer heating periods or higher temperatures or more active catalysts, such as mineral acids, to reach the desired completeness of reaction which can be conveniently measured by using an excess of the phenolic reactant, separating and measuring the excess at the end of a test cycle; when phenol is a reactant, the excess can be removed by vacuum distillation.

Tung oil is a representative fatty oil for combination with phenol in the preparation of the phenol-oil complex. Various other fatty oils, drying, semi-drying or non-drying, such as linseed, rape seed, oiticica, dehydroxylated castor oil, perilla, fish or mixtures thereof, can be substituted wholly or partly for the tung oil, with a corresponding change in the specific properties of the resulting product. Oils which comprise substantial quantities of components containing conjugate double bonds are preferred and can be used in the raw state or in a heated or air-blown state; but oils such as linseed, soya bean, and perilla, which in their raw state do not contain substantial quantities of products having conjugate double bonds, can be converted at least partially into conjugate double bonded oils by heat treatment or blowing with air, and in general heat treatment and blowing with air render the oils more readily soluble. In place of the oils or glycerides the corresponding free fatty acids can be substituted, such as the linoleic acid series, fish oil acids as clupanodonic, dehydroxylated castor oil acids as dehydroxylated ricinoleic, etc.

Proportions of phenol to fatty oil in making the complex can cover a wide range so that either excess phenol or excess fatty oil is included in the final composition. In general, however, the proportions can vary from the ratio of one mol of the oil to one of the phenol up to that ratio where one mol of the phenol is united for each unsaturated bond of the glyceride or fatty acid used; or expressed by weight from about 100 parts of phenol to from 75 to 300 parts of fatty oil. Preferably phenol is included to excess during the reaction period, i. e. at least 100 parts of phenol to 150 parts of oil as the excess tends to prevent polymerization of the oil and favors a more complete reaction. At the end of the reaction period the excess phenol can be removed as by distillation or by washing with a solvent for the phenol that does not dissolve the complex.

Suitable catalysts for preparing the complex are acids such as oxalic, acetic, salicylic, hydrochloric including chlorides of aluminum and sulfur, sulfuric, sulfur antimony, sulfides, phosphoric, boric and other organic and mineral acids, aluminum, basic agents such as the oxides of magnesium, zinc, lead, cadmium, and in general basic oxides of non-alkali forming metals, and salts of relatively strong bases and weak acids as sodium acetate, sodium borate, zinc stearate and the like, or basic compounds which do not saponify oils to a substantial degree.

The phenol-oil complex is mixed with a phenolic resin soluble therein and which is heat-hardenable. The soluble forms of resins comprise those obtained by reacting an alkyl or aryl substituted phenol such as cresols, xylenols, tertiary amyl and butyl phenols and the phenylphenols with formaldehyde in excess of equimolecular proportions and in the presence of an alkaline catalyst such as ammonia, sodium hydroxide, etc.; the resins are generally but not necessarily soluble in the fatty oils. The mixing is preferably performed in a kneading machine or on rolls and with or without the addition of solvent. Heat can be applied, if desired or if found necessary, to promote the mixing at temperatures which may range from 50° to 150° C. Another method of mixing is that of dissolving the components separately in coal tar hydrocarbons, as toluol, xylol and the like, and then cold blending the solutions, or the components are added to a coal tar hydrocarbon; after mixing solvent can be distilled off.

In order to illustrate the process and products of this invention several examples, wherein different phenol-oil complexes are used, are given.

*Example 1.*—400 parts by weight of phenol, 300 parts of tung oil and 4 parts of phosphoric acid are heated under reflux conditions for 5 hours. The excess of phenol remaining uncombined is then removed by vacuum distillation. The residue, a viscous sticky product (containing not more than 5% of free phenol) is soluble in common coal tar hydrocarbons, such as toluol, xylol and the like. When the heating at elevated temperatures is continued, there results a gelled rubbery mass which is insoluble in most solvents; heating is therefore discontinued before gelation sets in.

The complex so made is mixed with an oil-soluble heat-hardenable resin. Any of the phenolic resins so characterized can be used; but for illustration, a resin obtained by reacting para-phenyl-phenol with formaldehyde in excess of equimolecular proportions and in the presence of ammonia is selected. The resin in a powdered solid condition can be added to the viscous complex in a kneader or on rolls in the proportions say of one part of resin to two to four parts of the complex, and the mixing is continued until substantial uniformity is reached. When used for coatings the composition is made into a solution of desired viscosity for dip, spray or brush applications by means of toluol, xylol or the like, and the coatings are then baked.

Various proportions of resin can be incorporated with the phenol-oil complex. As little as 5% of resin added to a phenol-oil complex gives when baked a solid but flexible, tough product that is useful as a binder in floor coverings, cements, filling and caulking materials or as a flexible durable water-resistant coating for paper, fabric, metal and the like; the product as a coating is particularly remarkable for its great adhesion to metal and the like while retaining its toughness and flexibility. Higher percentages of resin yield progressively harder products; for instance one part of resin to two parts of the phenol-oil complex gives a coating which is extremely tough and adherent but hard when baked for about 45 minutes at about 120° C. Useful products also result with small percentages say 5 to 10 per cent of the phenol-oil complex added to a resin by improving toughness and elasticity. For most purposes the desirable proportions range from about one part of resin to two to four parts of the phenol-oil complex.

Coating compositions so produced can be applied in any thickness, even of several inches, without fear of wrinkling, since the film does not air dry but is baked to harden or polymerize it. Only moderate temperatures ranging from about 65° to 200° C. are needed for the purpose of baking, depending upon the heating period and thickness of film. In general for a film of common thickness, 45 minutes at about 120° C. or 20 minutes at about 200° C. gives a solidified product that is very tough, adherent and chemically resistant.

*Example 2.*—100 parts of commercial meta-para cresol, 75 parts of tung oil and 1 part of phosphoric acid are heated under reflux conditions for 8 hours. The uncombined cresols are distilled off under a vacuum of 10 mm. of mercury, the temperature being gradually raised to 200° C., to yield 114 parts of a cresol-oil complex. When 2 parts of oxalic acid are substituted for the phosphoric acid catalyst, the reaction is much slower, requiring 48 hours of heating under reflux to yield 103.5 parts of cresol-oil complex.

100 parts of either of the above cresol-oil complexes when dissolved in toluol and mixed with 50 parts of a heat-hardenable oil-soluble phenolic resin, yield films which after baking one hour at 135° C. or one-half hour at 150° C. are unusually hard, tough and flexible. Products made from meta-para cresol yield baked films having a better color than similar products made from the phenolic material of Example 1.

*Example 3.*—100 parts of phenol, 300 parts of tung oil and 5 parts of boric acid are heated under reflux conditions for 3 to 5 hours at approximately 180° C.; vacuum distillation to remove unreacted phenol improves the final product. Products catalyzed with the boric acid converting agent are lighter in color than those reacted in the presence of phosphoric acid. The phenol-oil complex so made is mixed with a soluble heat-hardenable resin in accordance with the method given in Example 1.

Compositions made in accordance with this invention are in general characterized by light color and stability in storage without gelling or thickening with age. Those from which free phenol has been removed have been found particularly useful in the coating of cans on account of the absence of odor, their chemical resistance, and their extreme toughness and adherence.

What is claimed is:

1. Composition suitable for coatings hardening by polymerization under the action of heat without substantial oxidation into a homogeneous solid of uniform character and comprising a substantially non-oxidizable reaction product of a monohydric phenol and an oxidizable fatty oil containing a conjugate double bond, said product having present not more than five per cent of the free phenol and having added thereto a hardening agent comprising a separately prepared heat-hardening oil-soluble resin obtained from formaldehyde reacted with a phenol substituted by a member of the group consisting of the alkyl and aryl radicals.

2. Composition according to claim 1 in which phenol is reacted with the fatty oil.

3. Composition according to claim 1 in which the phenol of the reaction product is united in the ratio of one mol or more to each mol of the fatty oil.

4. Composition according to claim 1 in which the fatty oil is tung oil.

5. Composition according to claim 1 in which one part by weight of the hardening agent is added to two to four parts of the reaction product.

6. Composition according to claim 1 in which the hardening agent comprises five per cent or more of the composition.

7. Composition according to claim 1 in which the hardening agent is the reaction product of para-phenyl phenol.

VICTOR H. TURKINGTON.